United States Patent
Sakai et al.

(10) Patent No.: US 11,958,723 B2
(45) Date of Patent: Apr. 16, 2024

(54) UNLOADING JIG, UNLOADING METHOD, AND METHOD FOR PRODUCING SILICON ROD

(71) Applicant: TOKUYAMA CORPORATION, Yamaguchi (JP)

(72) Inventors: Junya Sakai, Yamaguchi (JP); Kazuhiro Kawaguchi, Yamaguchi (JP)

(73) Assignee: TOKUYAMA CORPORATION, Yamaguchi (JP)

( * ) Notice: Subject to any disclaimer, the term of this patent is extended or adjusted under 35 U.S.C. 154(b) by 381 days.

(21) Appl. No.: 17/602,905

(22) PCT Filed: Apr. 15, 2020

(86) PCT No.: PCT/JP2020/016505
§ 371 (c)(1),
(2) Date: Oct. 11, 2021

(87) PCT Pub. No.: WO2020/235264
PCT Pub. Date: Nov. 26, 2020

(65) Prior Publication Data
US 2022/0194747 A1 Jun. 23, 2022

(30) Foreign Application Priority Data
May 21, 2019 (JP) .................. 2019-095158

(51) Int. Cl.
*H01L 31/18* (2006.01)
*B66C 1/16* (2006.01)
*C01B 33/035* (2006.01)

(52) U.S. Cl.
CPC .............. *B66C 1/16* (2013.01); *C01B 33/035* (2013.01)

(58) Field of Classification Search
None
See application file for complete search history.

(56) References Cited

U.S. PATENT DOCUMENTS

| 5,488,924 A * | 2/1996 | Horvath | C30B 15/02 117/214 |
| 2011/0002835 A1* | 1/2011 | Kimbel | C30B 15/32 423/348 |

(Continued)

FOREIGN PATENT DOCUMENTS

| CN | 202764059 | 3/2013 |
| CN | 202764059 U * | 3/2013 |

(Continued)

OTHER PUBLICATIONS

CN-202764059-U translation. Mar. 2013 (Year: 2013).*

(Continued)

*Primary Examiner* — Cachet I Proctor
(74) *Attorney, Agent, or Firm* — Casimir Jones, S.C.; Robert A. Goetz

(57) ABSTRACT

A takeout jig (1) includes: a support part (20) which is configured to be pulled up to take out a silicon rod (10) and which is configured to support the silicon rod (10) by clamping one or more end portions (15) of the silicon rod (10); one or more first cords (30) which are equal in number to or greater in number than the silicon rod (10) and which are configured to pull up the support part (20); and one or more second cords (40) which are configured to hold the silicon rod (10) by wrapping around the silicon rod (10).

8 Claims, 5 Drawing Sheets

(56) References Cited

U.S. PATENT DOCUMENTS

2012/0285373 A1* 11/2012 Meyer .................... C30B 29/06
                                                                                   117/214
2015/0003952 A1* 1/2015 Kurosawa ................. B66C 3/02
                                                                                    414/785

FOREIGN PATENT DOCUMENTS

| JP | 2010-180078 A | 8/2010 | |
|----|---------------|--------|---|
| JP | 2013-043734 | 3/2013 | |
| JP | 2013-159504 | 8/2013 | |
| WO | 2013/114858 | 8/2013 | |
| WO | WO 2015/046948 | 4/2015 | |
| WO | WO-2015046948 A1 * | 4/2015 | ........... C01B 33/035 |

OTHER PUBLICATIONS

Office Action for CN Patent Application No. 202080028504.8, dated Nov. 1, 2023, 11 pages.
Written Opinion for PCT/JP2020/016505 and its English translation, dated Nov. 16, 2021, 4 pages.
International Search Report for PCT/JP2020/016505 and its English translation, dated Jul. 14, 2020, 2 pages.

\* cited by examiner

UNLOADING JIG, UNLOADING METHOD, AND METHOD FOR PRODUCING SILICON ROD

TECHNICAL FIELD

The present invention relates to a takeout jig, a takeout method, and a method of producing a silicon rod.

BACKGROUND ART

A takeout jig for taking a silicon rod out of a reactor is known as a conventional technique. For example, Patent Literature 1 discloses a takeout jig which includes: a tubular member for housing a silicon rod therein; and an air bag which is disposed in the tubular member and which holds the silicon rod within the tubular member by pressing the lateral surface of the silicon rod.

CITATION LIST

Patent Literature

[Patent Literature 1]
Japanese Patent Application Publication, Tokukai, No. 2013-159504 (Publication date: Aug. 19, 2013)

SUMMARY OF INVENTION

Technical Problem

However, with the takeout jig disclosed in Patent Literature 1, the silicon rod is contacted much by the tubular member and the air bag. Therefore, there is an issue in that, when the silicon rod is taken out of the reactor, shaking of the tubular member may cause damage to the silicon rod. There is also an issue in that, if the silicon rod is contacted much, a polycrystalline silicon rod is contaminated. An object of an aspect of the present invention is to sufficiently reduce the contact with the silicon rod and to reduce damage to the silicon rod.

Solution to Problem

In order to attain the above object, a takeout jig in accordance with an aspect of the present invention includes: a support part which is configured to be pulled up to take out a silicon rod including one or more straight barrel portions and which is configured to support the silicon rod by clamping one or more end portions of the silicon rod; one or more first cords which are connected to the support part, which are equal in number to or greater in number than the silicon rod, and which are configured to pull up the support part; and one or more second cords which are connected to the one or more first cords and which are configured to hold the silicon rod by wrapping around the silicon rod.

A takeout method in accordance with an aspect of the present invention includes the steps of: connecting, to a support part, one or more first cords which are configured to pull up the support part and which are equal in number to or greater in number than a silicon rod including one or more straight barrel portions, the support part being used to support the silicon rod so as to take out the silicon rod; pulling up the support part; supporting the silicon rod by clamping one or more end portions of the silicon rod with the support part; and holding the silicon rod by wrapping one or more second cords around the silicon rod, the one or more second cords being connected to the one or more first cords.

A method of producing a silicon rod in accordance with an aspect of the present invention includes the steps of: obtaining a silicon rod including one or more straight barrel portions by allowing silicon to be deposited on a silicon filament by passing electric current through the silicon filament in a reactor which includes at least a pair of electrodes and which is supplied with a source gas for silicon deposition, the silicon filament being connected to the pair of electrodes at both ends thereof; connecting, to a support part, one or more first cords which are configured to pull up the support part and which are equal in number to or greater in number than a silicon rod, the support part being used to support the silicon rod so as to take the silicon rod out of the reactor; pulling up the support part; supporting the silicon rod by clamping one or more end portions of the silicon rod with the support part; and holding the silicon rod by wrapping one or more second cords around the silicon rod, the one or more second cords being connected to the one or more first cords.

Advantageous Effects of Invention

An aspect of the present invention makes it possible to sufficiently reduce the contact with a silicon rod and reduce damage to the silicon rod.

DESCRIPTION OF EMBODIMENTS

Embodiment 1

Figure 1:
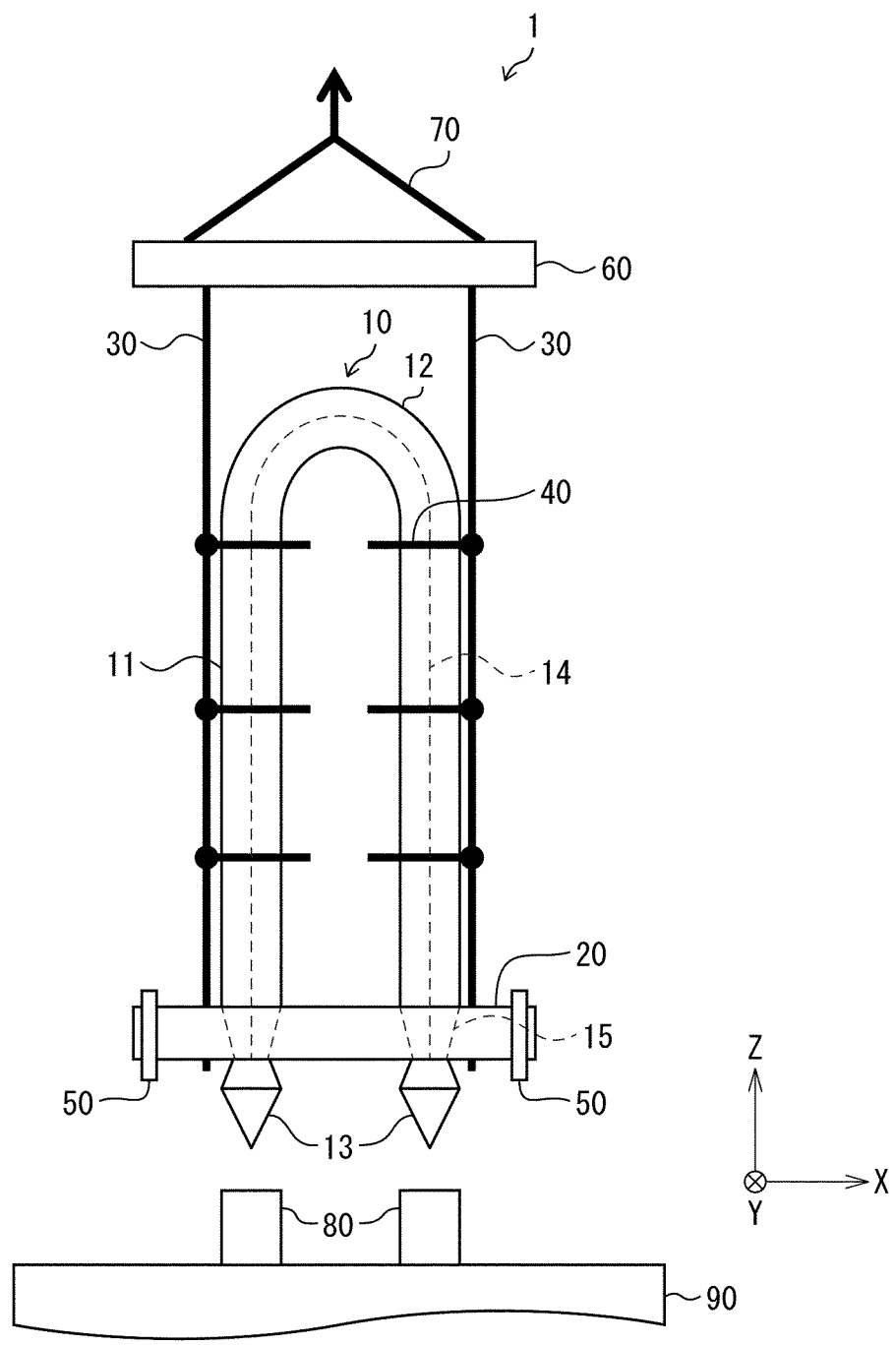
FIG. 1 illustrates a configuration of a takeout jig in accordance with Embodiment 1 of the present invention.
Figure 2:
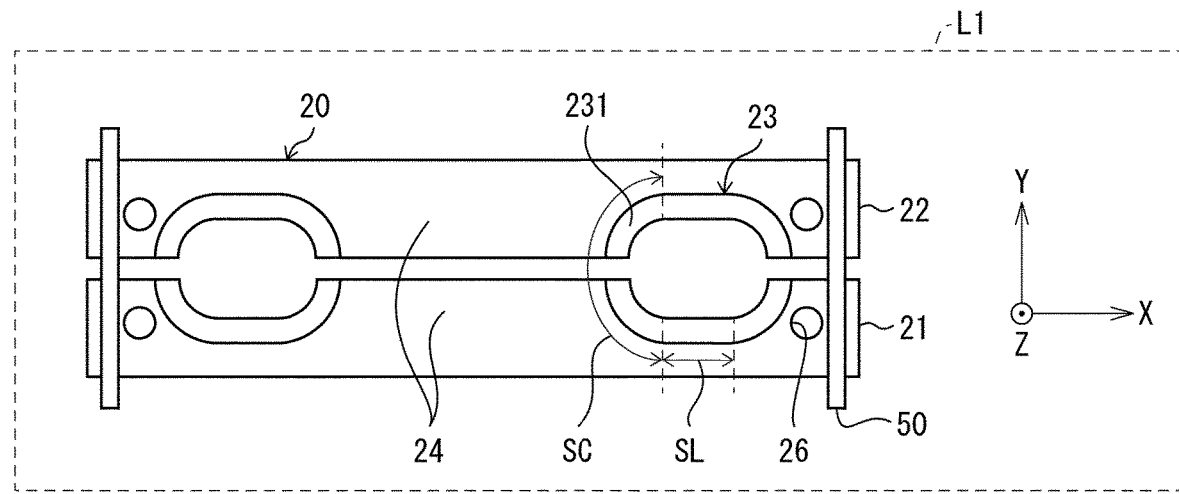
FIG. 2 illustrates a detailed configuration of a support part included in the takeout jig illustrated in FIG. 1.
Figure 2:
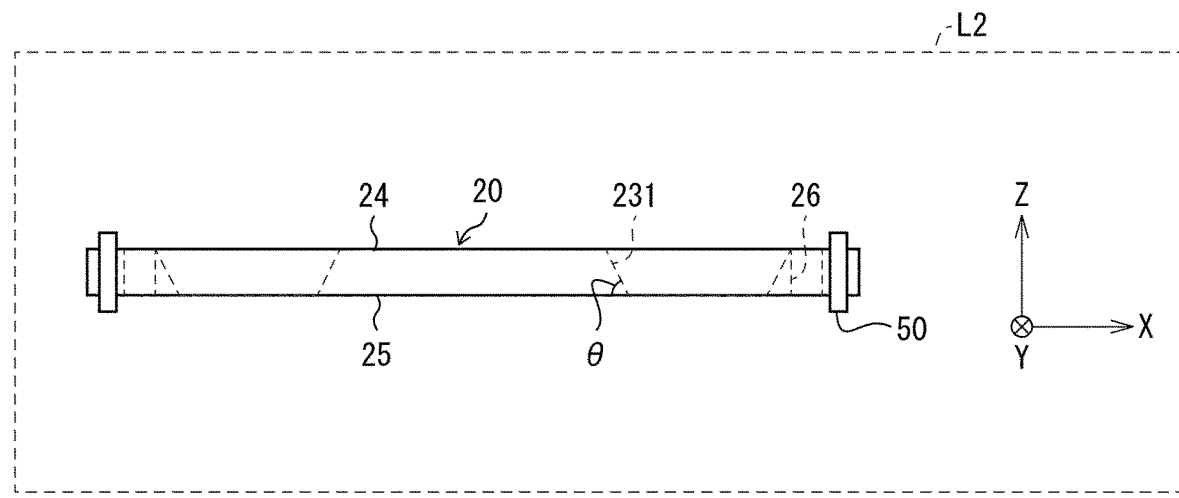

(Configuration of Takeout Jig 1)
The following description will discuss a configuration of a takeout jig 1, a method of taking out a silicon rod 10, and a method of producing the silicon rod 10, with reference to FIGS. 1 and 2. FIG. 1 illustrates a configuration of the takeout jig 1 in accordance with Embodiment 1 of the present invention. FIG. 2 illustrates a detailed configuration of a support part 20 included in the takeout jig 1 illustrated in FIG. 1. Note that a reactor 90 is composed of a base where the silicon rod 10 is to be disposed and a lid which is detachably attached to the base; however, FIG. 1 illustrates the base of the reactor 90 but does not illustrate the lid of the reactor 90. The reactor 90 is not illustrated in FIGS. 3 to 5.

Assume that, in FIG. 1, a direction along which straight barrel portions 11 of the silicon rod 10 are arranged is X direction, a direction along which two plate parts 21 and 22 of the support part 20 are arranged is Y direction, and a direction from the support part 20 to the silicon rod 10 is Z direction. The Z direction is an upward direction. The X direction, Y direction, and Z direction are orthogonal to each other. The X direction, Y direction, and Z direction in FIGS. 2 to 5 are the same as the X direction, Y direction, and Z direction in FIG. 1, respectively.

The takeout jig 1 is for use in taking the silicon rod 10 out of the reactor 90. As illustrated in FIG. 1, the takeout jig 1 includes the support part 20, first cords 30, second cords 40, fixing members 50, a first cord connecting part 60, and third cords 70. The silicon rod 10 to be taken out of the reactor 90 has a letter U shape made up of two straight barrel portions 11 united at their top. Specifically, top ends of the two straight barrel portions 11 are coupled to each other with a bridging portion 12 therebetween.

The reactor 90 includes at least a pair of electrodes 80. A source gas for silicon deposition is supplied into the reactor 90 under the conditions in which the lid of the reactor 90 is attached to the base of the reactor 90. In such a case, electric current is passed through a silicon filament 14 connected to the electrodes 80 at the opposite ends thereof to allow silicon to be deposited on the silicon filament 14, thereby obtaining the silicon rod 10 including the straight barrel portions 11 and the bridging portion 12 (the step of obtaining a silicon rod).

The source gas for silicon deposition supplied into the reactor 90 is, for example, gas of a silane compound such as trichlorosilane or monosilane. The opposite ends of the silicon filament 14 are composed of filament holding members 13 made of carbon. The present invention is not limited in application to cases where the silicon deposited on the silicon filament 14 is polycrystalline silicon, but can also be applied to cases where the silicon deposited on the silicon filament 14 is monocrystalline silicon.

(Configuration of Support Part 20)

The support part 20 is pulled up to take out the silicon rod 10, and supports the silicon rod 10 by clamping end portions 15 of the silicon rod 10 (the step of supporting the silicon rod). The support part 20 is used to support the silicon rod 10. The support part 20 is made of, for example, a resin. The resin is not particularly limited. A polyamide resin, a polyester resin, an acrylic resin, a methacrylic resin, a polyurethane resin, an epoxy resin, a polycarbonate resin, a polyolefin resin, and/or the like can be used. In FIG. 2, the part enclosed by dotted line L1 is a plan view of the support part 20, and the part enclosed by dotted line L2 is an elevational view of the support part 20.

As illustrated in the part enclosed by the dotted line L1 in FIG. 2, the support part 20 has two openings 23 within which the respective two end portions 15 of the silicon rod 10 in the letter U shape fit when two end portions 15 are clamped with the support part 20. The two openings 23 each have a shape whose longitudinal direction is identical to a direction along which the two end portions 15 are arranged (X direction).

With the above configuration, it is possible to easily fit, within the respective two openings 23, the two end portions 15 of any of various silicon rods 10 which vary in the distance between the two end portions 15. This eliminates the need for preparing a plurality of takeout jigs which vary in the distance between the two openings 23, and makes it possible to improve the performance of taking out the silicon rod 10. Note that the two openings 23 need only have sizes that allow two end portions 15 of various silicon rods 10 to fit in the respective two openings 23, regardless of a varying distance between two end portions 15.

The support part 20 is comprised of the two plate parts 21 and 22, which clamp the two end portions 15 therebetween. Under the conditions in which the two plate parts 21 and 22 clamp the two end portions 15 therebetween, one of the fixing members 50 is fitted on the two plate parts 21 and 22 at one end thereof in the X direction, and the other of the fixing members 50 is fitted on the two plate parts 21 and 22 at the other end thereof in the opposite direction to the X direction.

With this, the two fixing members 50 are placed such that the two fixing members 50 externally surround the two plate parts 21 and 22, and fix the distance between the two plate parts 21 and 22. With the configuration, since the distance between the two plate parts 21 and 22 is fixed with the fixing members 50, it is possible to fix the silicon rod 10 to the support part 20.

Furthermore, since the distance between the two plate parts 21 and 22 is fixed with the fixing members 50, recesses in the plate part 21 and recesses in the plate part 22 are positioned so as to face each other. The recesses form the openings 23. The two plate parts 21 and 22 each have two holes 26 for passage of a first cord 30. That is, the support part 20 has four holes 26.

As illustrated in the part enclosed by the dotted line L1 in FIG. 2, the openings 23 are each formed of straight lines corresponding to the portion indicated by line SL and semicircles corresponding to the portion indicated by line SC, when seen from the opposite direction to the Z direction. That is, the two openings are each formed of two straight lines and two semicircles. Note that the two openings 23 may each be formed of an oval whose longitudinal direction is the X direction. Areas to which a force in the Z direction is applied to the silicon rod 10 when the silicon rod 10 is pulled up are the two end portions 15.

Each of the two openings 23 formed in the support part 20 at least has a portion that tapers with increasing distance from a first surface 24 (located on the side where the silicon rod 10 is supported) of the support part 20 and decreasing distance from a second surface 25 (located on the opposite side of the support part 20 from the first surface 24) of the support part 20. For example, each of the two openings 23 has a sloping surface 231 which forms the portion that tapers with increasing distance from the first surface 24 and decreasing distance from the second surface 25. In the part enclosed by the dotted line L2 in FIG. 2, each of the openings 23 is formed only of the sloping surface 231; however, each of the openings 23 may have a shape in which a part of the opening 23 tapers with increasing distance from the first surface 24 and decreasing distance from the second surface 25.

The two end portions 15 of the silicon rod 10 have curved surfaces; therefore, with the above configuration, the silicon rod 10 can be easily fitted into the support part 20. This makes it possible to cause the silicon rod 10 to be firmly supported by the support part 20. Furthermore, for example, in a case where the support part 20 is made of a resin, the formation of the sloping portion having the tapering shape makes it possible to reduce the area of contact between the silicon rod 10 and the support part 20. This makes it possible to reduce, for example, the amount of the support part 20 lost in wear. As a result, it is possible to prevent or reduce the contamination of silicon with impurities.

With regard to the silicon rod 10 to be taken out, a support part 20 having a sloping surface 231 sloping at a larger angle θ to the second surface 25 may be prepared for a silicon rod 10 having smaller-diameter straight barrel portions 11. This makes it possible to cause the silicon rod 10 to be more firmly supported by the support part 20. Note that the openings 23 may have, instead of the sloping surface 231, a curved surface having a portion that has the shape that tapers with increasing distance from the first surface 24 and decreasing distance from the second surface 25.

(Configuration of First Cord 30)

The first cords 30 are configured to pull up the support part 20. The first cords 30 are connected to the support part 20 and the first cord connecting part 60, and are equal in number to or greater in number than the silicon rod(s) 10. For example, in a case where one silicon rod 10 is to be taken out, one or more first cords 30 are present. It is particularly preferable that the first cords 30 be equal in number or greater in number than the straight barrel portions 11 of the silicon rod(s) 10. For example, in a case of a silicon rod in a letter U shape having two straight barrel portions, one or more first cord need to be present, and preferably two or more first cords are present.

The upper limit of the number of the first cords 30 is preferably four times the number of the straight barrel portions 11, more preferably twice the number of the straight barrel portions 11, even more preferably equal to the number of the straight barrel portions 11, in terms of operation efficiency, operation stability, and a reduction in the area of contact.

The first cords 30, second cords 40, and third cords 70 are each preferably made of a resin. The resin is not particularly limited. A polyamide resin, a polyester resin, an acrylic resin, a methacrylic resin, a polyurethane resin, an epoxy resin, a polycarbonate resin, a polyolefin resin, and/or the like can be used.

In the case of FIG. 1, there is one silicon rod 10 to be taken out, the silicon rod 10 has two straight barrel portions 11, and there are two first cords 30. When the silicon rod 10 is taken out of the reactor 90, the first cords 30 are connected to the support part 20 (the step of connecting one or more first cords to a support part). The first cords 30 are located outside the silicon rod 10 in the direction along which the straight barrel portions 11 of the silicon rod 10 are arranged. The first cords 30 each extend parallel to the Z direction.

Assume here that the first cord connecting part 60 has the following four holes (which are not illustrated): a first hole, a second hole, a third hole, and a fourth hole. With regard to one of the first cords 30, a first end of that first cord 30 is passed through the first hole, and is attached to the portion of the first cord 30 between the support part 20 and the first cord connecting part 60 by tying a knot. With this, the first end of the first cord 30 is connected to the first cord connecting part 60.

A second end, which is the opposite end of the first cord 30 from the first end, is passed through one of the holes 26 in the plate part 21, and is passed through one of the holes 26 in the plate part 22. The second end is passed through the second hole and attached to the portion of the first cord 30 between the support part 20 and the first cord connecting part 60 by tying a knot. With this, the first cord 30 is connected to the support part 20 and the first cord connecting part 60.

Similar to the one of the first cords 30, the other of the first cords 30 is also passed through the third hole and the fourth hole, is passed through one of the holes 26 in the plate part 21 and one of the holes 26 in the plate part 22, and is thereby connected to the support part 20 and the first cord connecting part 60. Thus, in a case where there is one silicon rod 10 (there are two straight barrel portions 11) and there are two first cords 30, the two first cords 30 are connected to the support part 20 and the first cord connecting part 60 in the above described manner.

Figure 5:
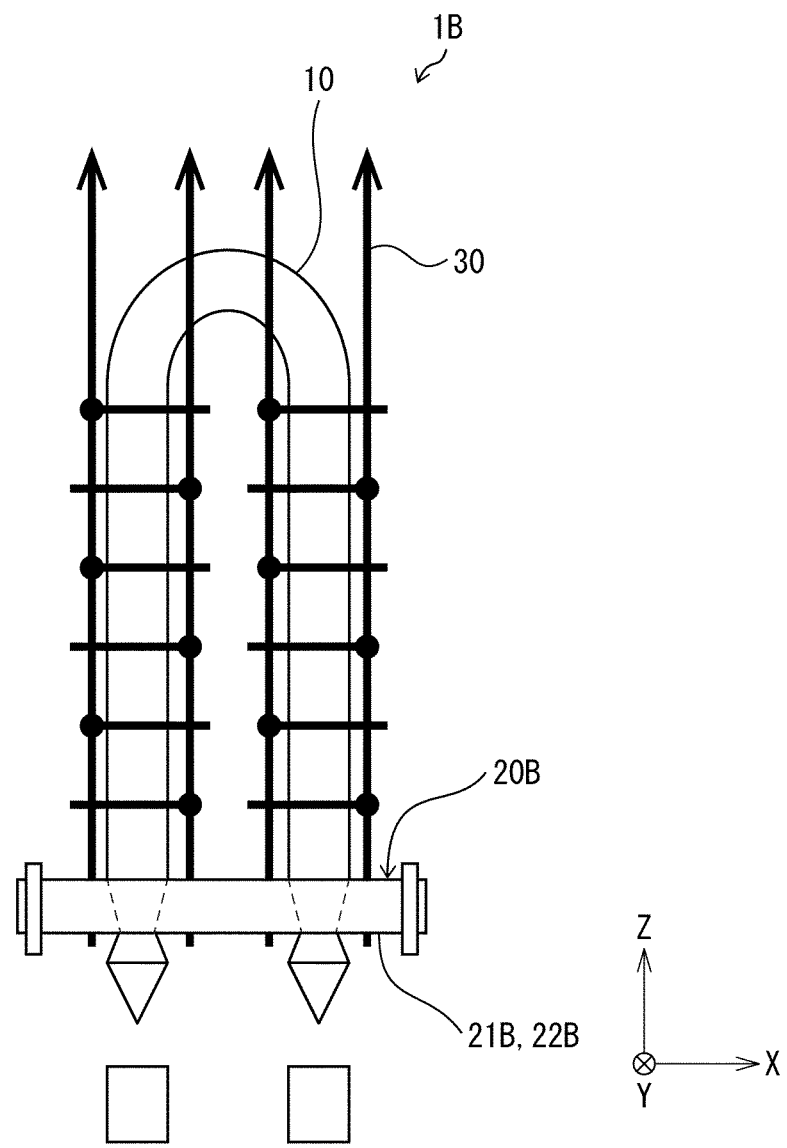
FIG. 5 illustrates a configuration of another takeout jig which is different from the takeout jig illustrated in FIG. 4.

For another example, assume a case where there is one silicon rod 10, the silicon rod 10 has two straight barrel portions 11, and there are four first cords 30, as illustrated in FIG. 5. Assume here that the first cords 30 and the first cord connecting part 60 are connected in the same manner as described earlier. In such a case, a first end of each of the four first cords 30 is connected to the first cord connecting part 60. A second end, which is the opposite end of the first cord 30 from the first end, may be passed through any of the holes 26 in the plate parts 21 and 22 and connected to the portion of the first cord 30 between the support part 20 and the first cord connecting part 60. With this, the four first cords 30 are connected to the support part 20 and the first cord connecting part 60 in the foregoing manner.

The manner in which the first cords 30 are connected to the support part 20 and the first cord connecting part 60 is not limited to the foregoing manner. Specifically, the number of the first cords 30, a method of connecting the first cords 30 and the support part 20, a method of connecting the first cords 30 and the first cord connecting part 60, and the like may be changed as appropriate, provide that the silicon rod 10 can be taken out. The same applies to the manner in which the third cords 70 are connected to the first cord connecting part 60.

Further assume a case where the bridging portion of the silicon rod 10 was broken during the deposition of the silicon rod 10 in the reactor 90. In such a case, a silicon rod has a letter I shape composed of a straight barrel portion 11. That is, there is one silicon rod, and the silicon rod has one straight barrel portion. In such a case, one first cord 30 is sufficient for the takeout jig 1, and the one silicon rod having a letter I shape can be taken out using the takeout jig 1.

(Configuration of Second Cord 40)

A second cord 40 is connected to one of the first cords 30, and holds the silicon rod 10 by wrapping around the silicon rod 10. Two or more second cords 40 may be provided. The second cords 40 are attached to the first cords 30 by tying a knot, and wrap around the straight barrel portions 11 of the silicon rod 10. When the silicon rod 10 is taken out of the reactor 90, the second cords 40 are wrapped around the silicon rod 10, thereby holding the silicon rod 10 (the step of holding the silicon rod).

(Configuration of First Cord Connecting Part 60)

The first cord connecting part 60 is located higher than the silicon rod 10 and has, connected thereto, a plurality of the first cords 30 such that the plurality of first cords 30 are each parallel to the longitudinal direction of the straight barrel portions 11. In other words, the first cord connecting part 60 is located downstream of the silicon rod 10 in the Z direction. Furthermore, since the plurality of first cords 30 are connected to the first cord connecting part 60, the plurality of first cords 30 are each parallel to the Z direction, which is the longitudinal direction of the straight barrel portions 11.

With the above configuration, the takeout jig 1 includes the first cord connecting part 60, and is therefore capable of stably carrying the silicon rod 10. Furthermore, since the second cords 40 and the like are easy to knot, operations are easy to perform. Specifically, since the silicon rod 10 would be pulled up and moved by a crane (not illustrated), the presence of the first cord connecting part 60 in the takeout jig 1 makes it possible to stably carry the silicon rod 10. The presence of the first cord connecting part 60 in the takeout jig 1 also makes it possible to prevent the entanglement of the first cords 30 and second cords 40. This makes it possible to improve operation efficiency and shorten the operation time.

The first cord connecting part 60 has the third cords 70 connected thereto. When the silicon rod 10 is taken out of the reactor 90, the support part 20 is pulled up by pulling one or more third cords 70 up with a crane under the conditions in which the silicon rod 10 is supported by the support part 20 (the step of pulling up the support part). Note that the takeout jig 1 does not need to include the third cords 70. In such a case, the first cords 30 are connected to the first cord connecting part 60, and the support part 20 is pulled up by pulling up the first cords 30 with a crane at a position higher than the first cord connecting part 60.

With regard to the number of second cords, an appropriate number can be selected as appropriate according to the size of the silicon rod 10. In particular, in terms of operation efficiency, operation stability, and a reduction in the area of contact, the number of second cords is preferably not less than the number of first cords and not more than ten times the number of first cords, more preferably not less than the number of first cords and not more than five times the number of first cords.

As such, the silicon rod 10 makes contact with the support part 20 and the second cords 40, and the support part 20 makes contact with the end portions 15 of the silicon rod 10. Only small parts of the end portions 15 are used as raw materials. Thus, it is possible to sufficiently reduce the contact with the silicon rod 10. Furthermore, since the silicon rod 10 is held by the second cords 40, it is possible to reduce the shaking of the silicon rod 10 that would occur when the support part 20 is pulled up. This makes it possible to reduce damage to the silicon rod 10. Furthermore, it is possible to safely perform the operation of taking out the silicon rod 10 in a short time.

(Configuration of Protective Member 16)

Figure 3:
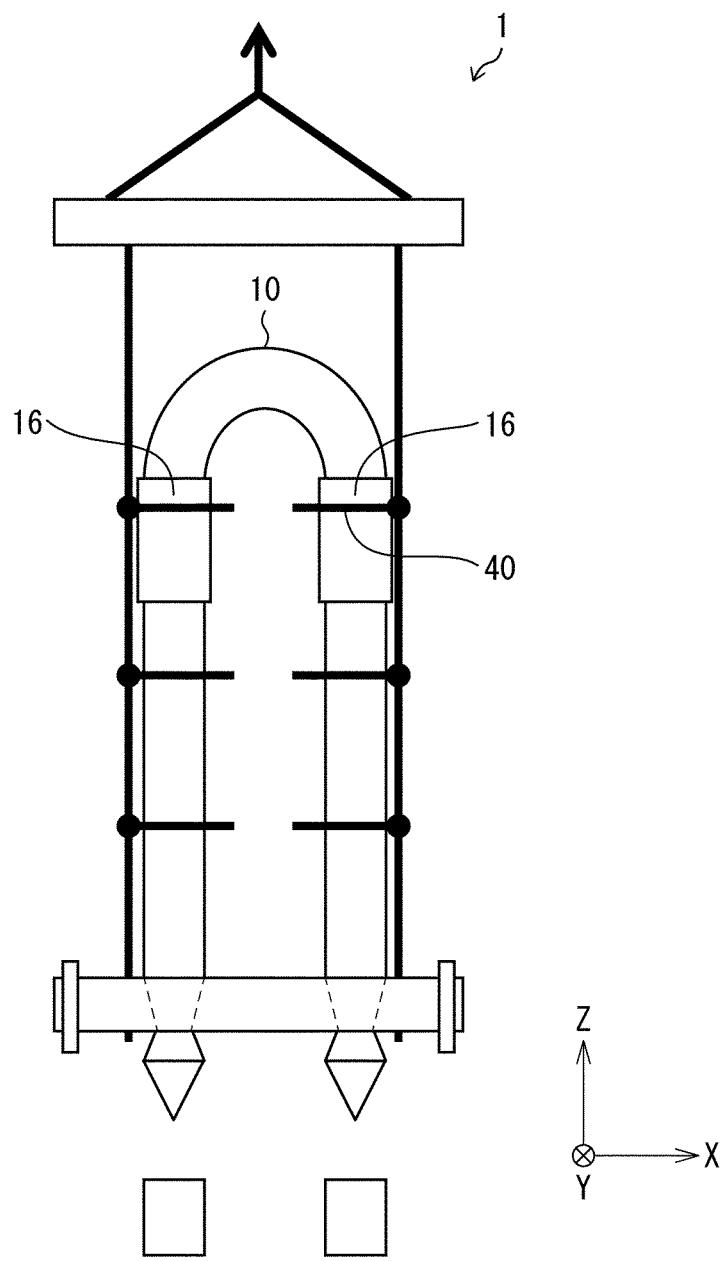
FIG. 3 illustrates the manner in which, in the takeout jig illustrated in FIG. 1, second cords hold a silicon rod with a protective member between the second cords and the silicon rod.

When the silicon rod 10 is taken out of the reactor 90, a protective member 16 for protection of the silicon rod 10 is preferably used, as illustrated in FIG. 3. That is, it is preferable that there be a plurality of second cords 40 and that at least one of the second cords 40 hold the silicon rod 10 with the protective member 16 between the second cord(s) 40 and the silicon rod 10. FIG. 3 illustrates the manner in which, in the takeout jig 1 illustrated in FIG. 1, second cords 40 hold the silicon rod 10 with protective members 16 between the second cords 40 and the silicon rod 10. Details are discussed below.

The presence of the protective members 16 between the silicon rod 10 and the second cords 40 makes it possible to disperse a force concentrating on the second cords 40, and possible to reduce cracking and breaking in the silicon rod 10. It is particularly preferable that a second cord(s) 40 which holds the silicon rod 10 at a position higher than the other second cord(s) 40 hold the silicon rod 10 with the protective member(s) 16 between the second cord(s) 40 and the silicon rod 10. The area where the second cord 40 at the highest position is located is an area subjected to the largest weight and force. In this area, the protective member 16 makes it possible to effectively reduce cracking and breaking in the silicon rod 10.

The protective member 16 need only be in the form of cloth, and may be in the form of a mesh and in the form of cloth. The protective member 16 is preferably made of an organic polymeric material (resin). In a case where the protective member 16 is in the form of a mesh, the protective member 16 can be used even if the protective member 16 is made of a metal material, because the protective member 16 in the form of a mesh is capable of reducing the area of contact between the silicon rod 10 and the protective member 16.

In a case where the protective member 16 is made of an organic polymeric material (resin), no or only a very few metal impurities attach themselves to the silicon rod 10 even if the silicon rod 10 makes contact with the protective member 16. The organic polymeric material (resin) is not particularly limited. A polyamide resin, a polyester resin, an acrylic resin, a methacrylic resin, a polyurethane resin, an epoxy resin, a polycarbonate resin, a polyolefin resin, and/or the like can be used.

Embodiment 2

Figure 4:
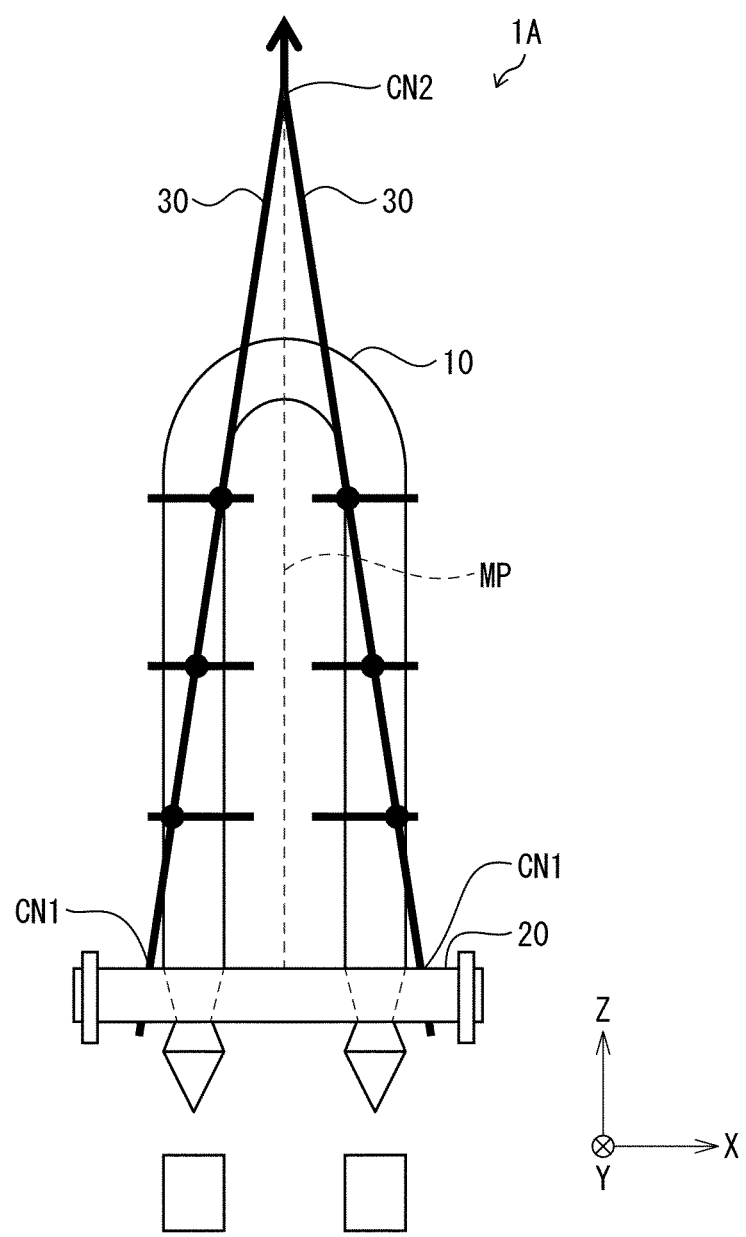
FIG. 4 illustrates a configuration of a takeout jig in accordance with Embodiment 2 of the present invention.

The following description will discuss Embodiment 2 of the present invention with reference to FIGS. 4 and 5. Note that, for convenience of description, members having functions identical to those described in Embodiment 1 are assigned identical referential numerals, and their descriptions are not repeated. FIG. 4 illustrates a configuration of a takeout jig 1A in accordance with Embodiment 2 of the present invention. FIG. 5 illustrates a configuration of a takeout jig 1B which is different from the takeout jig 1A illustrated in FIG. 4.

As illustrated in FIG. 4, the takeout jig 1A differs from the takeout jig 1 in that the takeout jig 1A does not include the first cord connecting part 60 or the third cords 70 and in the relationship between the first cords 30 and other members. With regard to one of the first cords 30, a first end of that first cord 30 is pulled up with a crane (not illustrated). A second end, which is the opposite end of the first cord 30 from the first end, is passed through one of the holes 26 in the plate part 21, passed through one of the holes 26 in the plate part 22, and connected to the first end. With this, the first cord 30 is connected to the support part 20.

In the same manner as the one of the first cords 30, the other of the first cords 30 is also connected to the support part 20 and pulled up with the crane. In such a case, areas of connection CN1 between the first cords 30 and the support part 20 are located outside the silicon rod 10 in the direction along which the straight barrel portions 11 of the silicon rod 10 are arranged. An area of connection CN2 between the first cords 30, which is located higher than the silicon rod 10, coincides with a middle position MP of the silicon rod 10 when seen from the opposite direction to the Z direction.

Therefore, in the takeout jig 1A, the direction of extension of the first cords 30 is not parallel to the Z direction but is at an angle to the direction parallel to the Z direction, as illustrated in FIG. 4. Specifically, in a case where there is one silicon rod 10 and there are two first cords 30, the two first cords 30 are connected to the support part 20 and pulled up with a crane as described earlier.

On the other hand, the takeout jig 1B differs from the takeout jig 1 in that the takeout jig 1B does not include the first cord connecting part 60 or the third cords 70, that the number of first cords 30 is different, and that the support part 20 is changed to a support part 20B, as illustrated in FIG. 5. The support part 20B is composed of two plate parts 21B and 22B similar to the support part 20.

The two plate parts 21B and 22B each have four holes 26 for passage of the first cords 30. That is, the support part 20B has eight holes 26. With regard to one of the first cords 30, a first end of that first cord 30 is pulled up with a crane (not illustrated). A second end, which is the opposite end of the first cord 30 from the first end, is passed through one of the holes 26 in the plate part 21B, passed through one of the holes 26 in the plate part 22B, and connected to the first end. With this, the first cord 30 is connected to the support part 20B.

In a similar manner to the one of the first cords 30, the other three first cords 30 are also connected to the support part 20B and pulled up with the crane. In such a case, the outer two first cords 30 are located outside the silicon rod 10 in the direction along which the straight barrel portions 11 of the silicon rod 10 are arranged. The inner two first cords 30 are located inside the silicon rod 10 in the direction along which the straight barrel portions 11 of the silicon rod 10 are arranged. That is, in a case where there is one silicon rod 10 and there are four first cords 30, the four first cords 30 are connected to the support part 20B and pulled up with a crane as described earlier.

Aspects of the present invention can also be expressed as follows:

A takeout jig in accordance with an aspect of the present invention includes: a support part which is configured to be pulled up to take out a silicon rod including one or more straight barrel portions and which is configured to support the silicon rod by clamping one or more end portions of the silicon rod; one or more first cords which are connected to the support part, which are equal in number to or greater in number than the silicon rod, and which are configured to pull up the support part; and one or more second cords which are connected to the one or more first cords and which are configured to hold the silicon rod by wrapping around the silicon rod.

With the above configuration, the silicon rod makes contact with the support part and the second cord(s), and the support part makes contact with the end portion(s) of the silicon rod. Only small part(s) of the end portion(s) are used as raw materials. Thus, it is possible to sufficiently reduce the contact with the silicon rod. Furthermore, since the silicon rod is held by the second cord(s), it is possible to reduce the shaking of the silicon rod that would occur when the support part is pulled up. This makes it possible to reduce damage to the silicon rod.

The silicon rod to be taken out may have a letter U shape made up of two of the straight barrel portions united at their top; the support part may have two openings within which respective two of the end portions of the silicon rod in the letter U shape fit when the two end portions are clamped with the support part; and the two openings may each have a shape whose longitudinal direction is identical to a direction along which the two end portions are arranged.

With the above configuration, it is possible to easily fit, within the respective two openings, the two end portions of any of various silicon rods which vary in the distance between the two end portions. This eliminates the need for preparing a plurality of takeout jigs which vary in the distance between the two openings, and makes it possible to improve the performance of taking out the silicon rod.

Each of the two openings may be formed in the support part such that each of the two openings at least has a portion that tapers with increasing distance from a first surface of the support part and decreasing distance from a second surface of the support part, the first surface being located on a side where the silicon rod is supported, the second surface being located on an opposite side of the support part from the first surface.

The two end portions of the silicon rod have curved surfaces; therefore, with the above configuration, the silicon rod can be easily fitted into the support part. This makes it possible to cause the silicon rod to be firmly supported by the support part. Furthermore, for example, in a case where the support part is made of a resin, the formation of the sloping portion having the tapering shape makes it possible to reduce the area of contact between the silicon rod and the support part. This makes it possible to reduce, for example, the amount of the support part lost in wear. As a result, it is possible to prevent or reduce the contamination of silicon with impurities.

The support part may be composed of two plate parts configured to clamp the one or more end portions therebetween; and the takeout jig may further include a fixing member configured to fix a distance between the two plate parts. With the configuration, the distance between the two plate parts is fixed by the fixing member; therefore, it is possible to fix the silicon rod to the support part.

The takeout jig may further include a first cord connecting part which is located higher than the silicon rod and to which a plurality of the first cords are connected such that each of the plurality of first cords is parallel to a longitudinal direction of the one or more straight barrel portions.

With the above configuration, the takeout jig includes the first cord connecting part, and is therefore capable of stably carrying the silicon rod. Furthermore, since the second cord(s) and the like are easy to knot, operations are easy to perform. Specifically, since the silicon rod would be pulled up and moved by a crane, the presence of the first cord connecting part in the takeout jig makes it possible to stably carry the silicon rod. The presence of the first cord connecting part in the takeout jig also makes it possible to prevent the entanglement of the first cord(s) and second cord(s). This makes it possible to improve operation efficiency and shorten the operation time.

The takeout jig may include a plurality of the second cords, and at least one of the plurality of second cords may hold the silicon rod with a protective member between the at least one of the plurality of second cords and the silicon rod.

With the above configuration, the presence of the protective member between the silicon rod and the second cord makes it possible to disperse a force concentrating on the second cord, and possible to reduce cracking and breaking in the silicon rod. It is particularly preferable that a second cord which holds the silicon rod at a position higher than the other second cord(s) hold the silicon rod with the protective member between the second cord and the silicon rod. The area where the second cord at the highest position is located is an area subjected to the largest weight and force. In this area, the protective member makes it possible to effectively reduce cracking and breaking in the silicon rod.

The protective member need only be in the form of cloth, and may be in the form of a mesh and in the form of cloth. The protective member is preferably made of an organic polymeric material (resin). In a case where the protective member is in the form of a mesh, the protective member can be used even if the protective member is made of a metal material, because the protective member in the form of a mesh is capable of reducing the area of contact between the silicon rod and the protective member. In a case where the protective member is made of an organic polymeric material, no or only a very few metal impurities attach themselves to the silicon rod even if the silicon rod makes contact with the protective member.

A takeout method in accordance with an aspect of the present invention includes the steps of: connecting, to a support part, one or more first cords which are configured to pull up the support part and which are equal in number to or greater in number than a silicon rod including one or more straight barrel portions, the support part being used to support the silicon rod so as to take out the silicon rod; pulling up the support part; supporting the silicon rod by clamping one or more end portions of the silicon rod with the support part; and holding the silicon rod by wrapping one or more second cords around the silicon rod, the one or more second cords being connected to the one or more first cords.

A method of producing a silicon rod in accordance with an aspect of the present invention includes the steps of: obtaining a silicon rod including one or more straight barrel portions by allowing silicon to be deposited on a silicon filament by passing electric current through the silicon filament in a reactor which includes at least a pair of electrodes and which is supplied with a source gas for silicon deposition, the silicon filament being connected to the pair of electrodes at both ends thereof; connecting, to a support part, one or more first cords which are configured to pull up the support part and which are equal in number to or greater in number than a silicon rod, the support part being used to support the silicon rod so as to take the silicon rod out of the reactor; pulling up the support part; supporting the silicon rod by clamping one or more end portions of the silicon rod with the support part; and holding the silicon rod by wrapping one or more second cords around the silicon rod, the one or more second cords being connected to the one or more first cords.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST 1, 1A, 1B takeout jig
10 silicon rod
11 straight barrel portion
15 end portion
16 protective member
20, 20B support part
21, 21B, 22, 22B plate part
23 opening
24 first surface
25 second surface
30 first cord
50 fixing member
60 first cord connecting part
80 electrode
90 reactor

The invention claimed is:

1. A takeout jig comprising:
a support part which is configured to be pulled up to take out a silicon rod including one or more straight barrel portions and which is configured to support the silicon rod by clamping one or more end portions of the silicon rod;
one or more first cords which are connected to the support part, which are equal in number to or greater in number than the silicon rod, and which are configured to pull up the support part; and
one or more second cords which are connected to the one or more first cords and which are configured to hold the silicon rod by wrapping around the silicon rod.

2. The takeout jig as set forth in claim 1, wherein:
the silicon rod to be taken out has a letter U shape made up of two of the straight barrel portions united at their top;
the support part has two openings within which respective two of the end portions of the silicon rod in the letter U shape fit when the two end portions are clamped with the support part; and
the two openings each have a shape whose longitudinal direction is identical to a direction along which the two end portions are arranged.

3. The takeout jig as set forth in claim 2, wherein each of the two openings is formed in the support part such that each of the two openings at least has a portion that tapers with increasing distance from a first surface of the support part and decreasing distance from a second surface of the support part, the first surface being located on a side where the silicon rod is supported, the second surface being located on an opposite side of the support part from the first surface.

4. The takeout jig as set forth in claim 1, wherein:
the support part is composed of two plate parts configured to clamp the one or more end portions therebetween; and
the takeout jig further comprises a fixing member configured to fix a distance between the two plate parts.

5. The takeout jig as set forth in claim 1, further comprising a first cord connecting part which is located higher than the silicon rod and to which a plurality of the first cords are connected such that each of the plurality of first cords is parallel to a longitudinal direction of the one or more straight barrel portions.

6. The takeout jig as set forth in claim 1, comprising a plurality of the second cords, wherein at least one of the plurality of second cords holds the silicon rod with a protective member between the at least one of the plurality of second cords and the silicon rod.

7. A takeout method comprising the steps of:
connecting, to a support part, one or more first cords which are configured to pull up the support part and which are equal in number to or greater in number than a silicon rod including one or more straight barrel portions, the support part being used to support the silicon rod so as to take out the silicon rod;
pulling up the support part;
supporting the silicon rod by clamping one or more end portions of the silicon rod with the support part; and
holding the silicon rod by wrapping one or more second cords around the silicon rod, the one or more second cords being connected to the one or more first cords.

8. A method of producing a silicon rod, comprising the steps of:
obtaining a silicon rod including one or more straight barrel portions by allowing silicon to be deposited on a silicon filament by passing electric current through the silicon filament in a reactor which includes at least a pair of electrodes and which is supplied with a source gas for silicon deposition, the silicon filament being connected to the pair of electrodes at both ends thereof;
connecting, to a support part, one or more first cords which are configured to pull up the support part and which are equal in number to or greater in number than a silicon rod, the support part being used to support the silicon rod so as to take the silicon rod out of the reactor;
pulling up the support part;
supporting the silicon rod by clamping one or more end portions of the silicon rod with the support part; and
holding the silicon rod by wrapping one or more second cords around the silicon rod, the one or more second cords being connected to the one or more first cords.

* * * * *